P. H. & F. M. Roots.
Cross-Head for Blower.
No. 2900 Reissued Mar. 17, 1868.
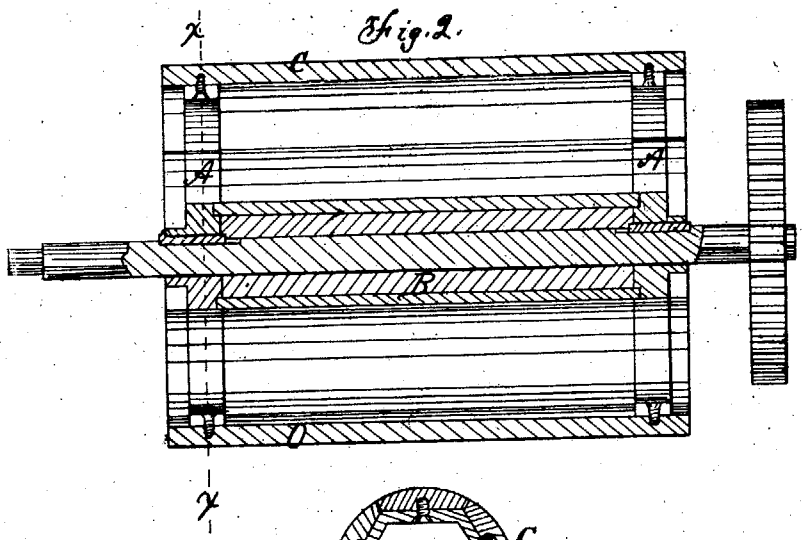
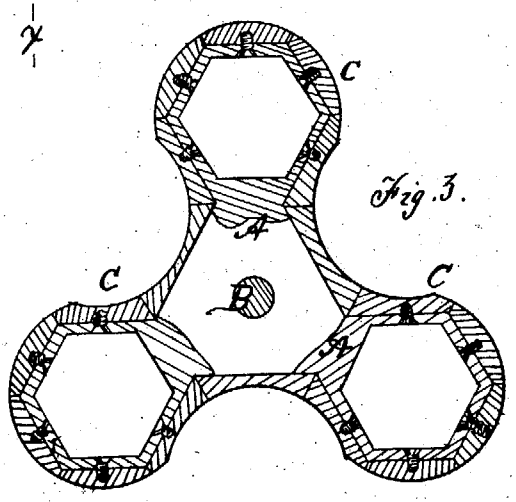
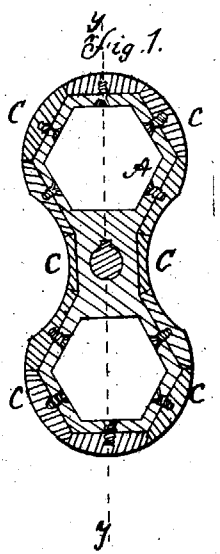
Witnesses.
Geo. W. Corbiell
Aug. M. Tanner
Inventor.
P. H. and F. M. Roots
by Munn & Co
Attorneys

United States Patent Office.

P. H. ROOTS AND F. M. ROOTS, OF CONNERSVILLE, INDIANA.

*Letters Patent No.* 56,614, *dated July* 24, 1866; *reissue No.* 2,900, *dated March* 17, 1868.

IMPROVEMENT IN CROSS-HEADS FOR BLOWERS.

The Schedule referred to in these Letters Patent and making part of the same.

TO ALL WHOM IT MAY CONCERN:

Be it known that we, P. H. ROOTS and F. M. ROOTS, of Connersville, Fayette county, Indiana, have invented a new and improved Piston for Rotary Blowers; and we do hereby declare that the following is a full, clear, and exact description thereof, which will enable others skilled in the art to make and use the same, reference being had to the accompanying drawing, forming part of this specification, in which—

Figure 1 represents a transverse section of this invention, the line *x x*, fig. 2, indicating the plane of section.

Figure 2 is a longitudinal vertical section of the same, taken in the plane indicated by the line *y y*, fig. 1.

Figure 3 is a transverse section of a piston with three convex and concave portions.

Similar letters of reference indicate like parts.

This invention relates to a piston for rotary blowers, constructed of two or more metallic cross-heads fastened on a suitable shaft, and made square, polygonal, or in any other desirable form or shape, in combination with wooden lags or strips, which are bolted to said cross-heads, and then dressed to the proper shape, in such a manner that a piston is obtained which can be constructed at less cost for material and labor, and with greater accuracy than pistons of the ordinary construction.

A represents two cross-heads, made of cast iron, brass, or any other suitable material, in the form best shown in fig. 1 of the drawing, although it must be remarked that the heads, instead of being hexagonal, might be square, polygonal, round, or of any other suitable form or shape, according to the size of the piston to be made. These cross-heads are firmly keyed or otherwise secured to the shaft B, at the proper distance apart, and then they are covered by wooden lags or strips C, which are fastened to said cross-heads by means of bolts or screws, or in any other suitable manner. If desired, suitable sleeves or thimbles D may be placed on the shaft, between the cross-heads, to steady the same and keep them at the proper distance apart. The lags or strips C, having been secured to the cross-heads A, are dressed to the required shape by planes properly shaped, or by any other suitable means.

In this manner pistons for rotary blowers can be constructed at a comparatively small expense of labor and material, and better adapted for the purposes intended than if made entirely of metal. Our pistons are tight, durable, easily worked out to the proper shape, and readily repaired if they wear out.

What we claim as new, and desire to secure by Letters Patent, is—

A piston, constructed of cross-heads A, fastened to a shaft, B, in combination with wooden lags or pieces C, which compose the covering of the piston, and are secured to the cross-heads, substantially as and for the purpose set forth.

P. H. ROOTS,
F. M. ROOTS.

Witnesses for P. H. ROOTS:
WM. F. MCNAMARA,
ALEX. F. ROBERTS.

Witnesses:
GEO. W. GRIFFIN,
ALEXANDER PARKER.